United States Patent Office 2,921,580
Patented Jan. 19, 1960

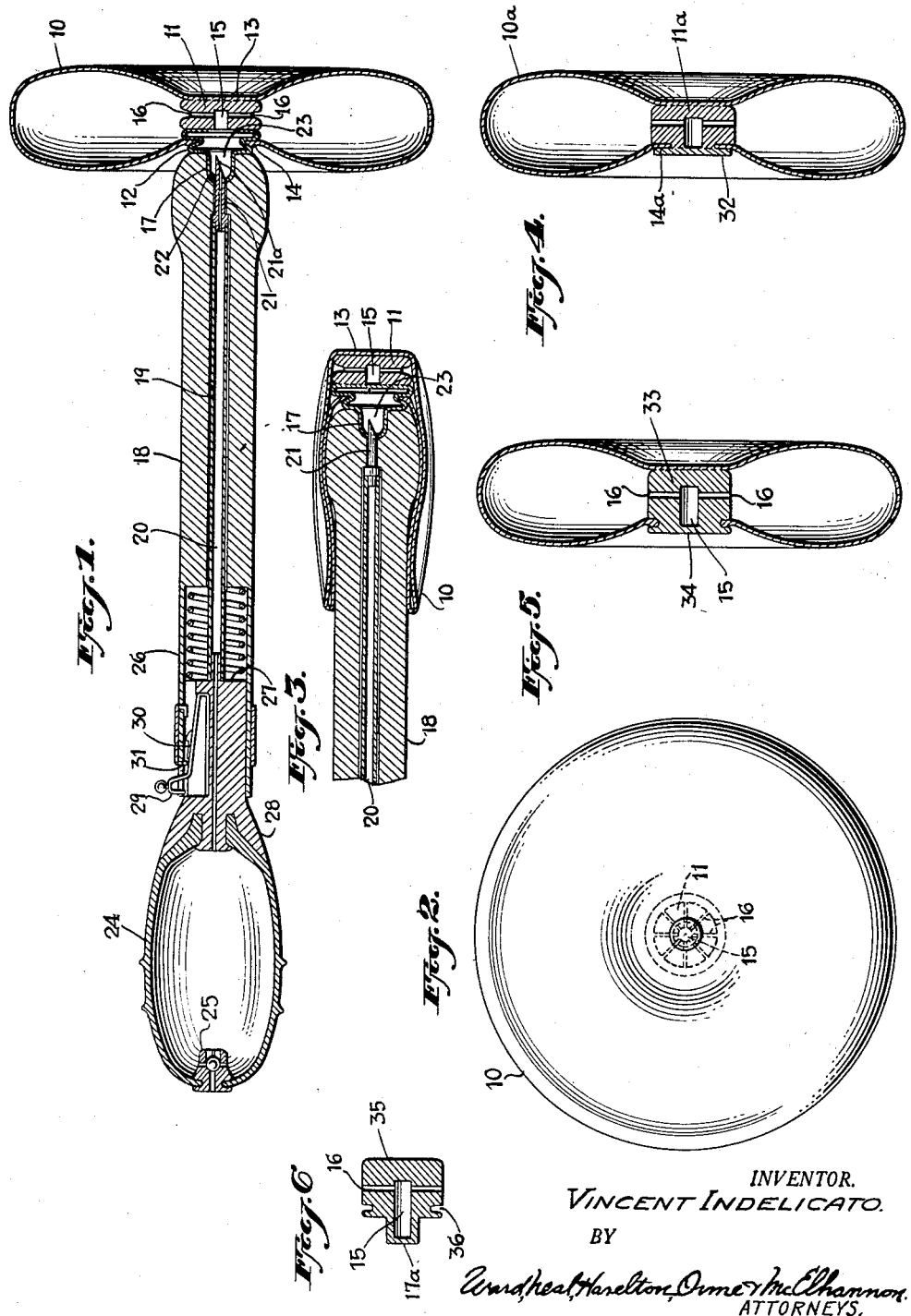

2,921,580

VAGINAL APPLIANCE APPLICATOR

Vincent Indelicato, New York, N.Y.

Original application May 27, 1955, Serial No. 511,473, now Patent No. 2,856,920, dated October 21, 1958. Divided and this application September 23, 1958, Serial No. 762,806

5 Claims. (Cl. 128—129)

This invention relates to a vaginal appliance and an applicator therefor and particularly to appliances which are insertable in the vagina of human females for the purpose of preventing the flow of fluids into the uterus and means for inserting such appliances into the vagina.

Inflatable vaginal appliances, e.g. pessaries, are known and may comprise an outer member of rubber which may be toroidal-like in shape and a mechanical valve for admitting air into the outer member and for retaining the air in the outer member after it is inflated. Such appliances are formed from relatively heavy rubber and employ relatively bulky and rigid valves. For these reasons the appliances are relatively expensive and form a relatively rigid obstruction in the vagina. Accordingly, these appliances are considered too expensive to be disposable after use and are not always comfortable for the wearer or for other reasons.

In addition, with the prior art types of construction, it has been difficult to insert and inflate the appliance and then to remove the inflating device. For example, if the construction is such that the appliance is first inserted in the vagina and then the inflating device is engaged with the valve, it has been difficult to locate the valve and engage it with the inflating device. On the other hand, if the inflating device is engaged with the valve prior to inserting the appliance in the vagina and if the engagement is sufficiently secure to prevent disengagement during the insertion process, it has been difficult to disengage the inflating device from the appliance after it is inflated without dislodging the appliance. This latter difficulty would be particularly serious if low air pressure were employed.

If it is desired merely to prevent the flow of fluids into the uterus, it is necessary to have only a firm contact between the outer wall of an imperforate appliance and the wall of the vagina and, therefore, in this case, the air pressure after the appliance is inflated may be relatively low. This is particularly true if the appliance is made of very thin, pliable rubber, such as latex rubber, which can readily conform to any irregular confining wall.

Furthermore, with low air pressures, it is possible to eliminate the usual mechanical valve and its objectionable features by making at least a portion of the member of a puncture-sealing rubber known as natural gum rubber. Such rubber is sold by the U.S. Rubber Co., New York, N. Y., for making medical stoppers for medicine containers and can be punctured by a small needle, e.g. a hypodermic needle, and after the needle is withdrawn, the puncture is sealed by the rubber. The seal is strong enough to withstand air pressures up to several pounds per square inch.

In accordance with my invention, a vaginal appliance for preventing the flow of fluids into the uterus comprises an inflatable member made of a thin, pliable material, preferably latex rubber, one portion of which is made of or is closed by a puncture-sealing material which preferably is pure natural gum rubber of the above-mentioned type although other known types of solid puncture-sealing material may be employed. Such an appliance is easy to insert and inflate, is inexpensive enough to be disposable after use and is sufficiently soft and pliable that it does not form an uncomfortable obstruction.

Accordingly, one object of my invention is to provide a vaginal appliance which is simple and inexpensive to make and which may be readily inserted and inflated.

A further object of my invention is to provide a vaginal appliance which is soft and pliable throughout and which, therefore, is not uncomfortable in use.

A further object of my invention is to provide a simple and reliable device for inserting and inflating the appliance of my invention.

Other objects of the invention will be apparent from the following detailed description of different embodiments of the invention which sets forth the manner in which I now prefer to practice the invention and from the accompanying drawings in which:

Fig. 1 is a cross-sectional, side elevation view of the preferred embodiment of the vaginal appliance of the invention and an applicator therefor;

Fig. 2 is an end view of the embodiment shown in Fig. 1;

Fig. 3 is a fragmentary, cross-sectional, side elevation view showing the form of the appliance prior to insertion and inflation;

Figs. 4 and 5 are cross-sectional, side elevation views of alternate forms of the appliance; and Fig. 6 is a cross-sectional side elevation view of a modified form of the inner member shown in Fig. 1.

The preferred embodiment of the invention shown in Fig. 1 comprises an inflatable, hollow outer member 10, a resilient inner member 11 and an inflating member 12 of puncture-sealing material. The outer member 10 preferably is made of thin latex or gum rubber and when inflated has the ring-shaped or toroidal-like form indicated in Fig. 1. The portion 13 of one wall of the member 10 is secured to one face of the inner member 11, such as by cement, and the opposite portion 14 of the opposite wall of the member 10 is secured in an annular recess in the inflating member 12. The portion 14 may be secured to the inflating member 12 by cement or it may be bonded thereto in any other desired manner which will provide an air-tight seal between the portion 14 and the member 12. The inflating member 12 is also secured to one face of the inner member 11 so that when the member 10 is inflated the central portions of the walls of the member 10 are constricted, thereby producing the ring or toroidal-like shape shown in Fig. 1.

The inner member 11 preferably is made of a relatively soft rubber, such as latex rubber, and has air ducts 15 and 16 therein which extend from the face of the inner member 11 nearest the inflating member 12 to the interior of the member 10. Said ducts 15 and 16 permit the passage of air from the inflating member 12 to the interior of the member 10.

The inflating member 12 is hollow and is provided with a neck portion 17 for purposes hereinafter described. As mentioned above, inflating member 12 is made of puncture-sealing material and preferably is made of pure, natural gum rubber of the type described above.

The preferred applicator for the appliance of the invention comprises an elongated tubular member 18 having a centrally disposed bore 19 therein. A hollow tube 20 is slidably mounted in the bore 19 of the member 18. The tube 20 has a hollow needle 21 attached thereto, the needle 21 being of relatively small diameter, e.g. 0.03 inch. Needle 21 has a pointed end 21a which, in the retracted position of the needle, is adjacent the bottom 22 of the cylindrical recess 23 in the end of the member 18, such recess 23 being co-axial of the bore 19 of the member 18. When the needle 21 is in the inflating position shown in Fig. 1, the pointed end 21a is adjacent but below the top of the recess 23.

Although other sources of inflating gas may be employed, inflating means in the form of a rubber bulb 24 is connected to one end of the tube 20 and is movable therewith. A check valve 25 permits air to be drawn into the bulb 24 when the bulb 24 is expanded and causes the air to pass through the bores of the tube 20 and the needle 21 when the bulb is compressed. Needle retracting means in the form of a spring 26 acts between the member 18 and a shoulder 27 on the rigid member 28 which interconnects the bulb 24 and the tube 20 and urges the needle 21 towards its retracted position.

The applicator is also provided with releasable catch means 29 which is mounted on the member 28 and takes the form of a U-shaped resilient member having a projecting portion 30 which is engageable with a stop 31 mounted on the member 18. Thus, when the needle 21 is moved to its inflating position shown in Fig. 1, it is retained in such position by the catch means 29. When the catch means 29 is depressed, the spring 26 moves the needle 21 into its retracted position.

Prior to inflation, the outer member 10 is flaccid and may be caused to assume the position shown in Fig. 3, Fig. 3 illustrating the configuration of the outer member 10 and the relative positions of the appliance and the applicator immediately prior to the insertion of the appliance into the vagina. However, prior to causing the outer member 10 to assume the position shown in Fig. 3, the appliance is placed on a relatively rigid surface with the portion 13 against such surface and with the neck portion 17 extending upwardly. The catch means 29 is released so that the needle 21 is in its retracted position. The end of the member 18 is then engaged with the neck portion 17 so that the neck portion 17 fits within the recess 23. The member 28 is pushed downwardly until the projecting portion 30 on the catch means 29 engages the stop 31, causing the pointed end 21a of the needle 21 to puncture the neck portion 17.

The appliance preferably is provided with the neck portion 17 and the member 18 preferably is provided with the recess 23 because such combination assists in retaining the appliance in engagement with the applicator during insertion of the appliance and, in addition, the walls of the recess 23 provide support for the inflating member 12 during the puncturing thereof by the pointed end 21a of the needle 21. If the inflating member 12 is unsupported during the puncturing step, the wall of the inflating member gives under pressure of the needle and makes it difficult to puncture said wall with the needle.

Also, in addition to functioning as means for constricting the walls of the outer member 10, the inner member 11 assists in the puncturing of the inflating member 12 by the needle 21. Thus, air duct 15 of the inner member 11 provides a recess for reception of the pointed end 21a of the needle 21 and prevents the pointed end 21a from puncturing the portion 13 of the wall of the outer member 10.

After the applicator has been engaged with the appliance and the needle 21 has punctured the inflating member 12, the outer member 10 is positioned as shown in Fig. 3 and the appliance is inserted into the vagina by means of the applicator. After insertion of the appliance and before removing the applicator, the outer member 10 is inflated to the desired pressure by squeezing the bulb 24. When the member 10 is properly inflated, it assumes approximately the shape shown in Fig. 1. In its inflated condition, the outer member 10 engages the wall of the vagina and the portion 13 is approximately over the end of the cervix. Thus, the appliance provides a fluid-tight seal with the wall of the vagina and prevents the entrance of the fluids into the uterus.

After the outer member 10 is properly inflated, the catch means 29 is released, causing the needle 21 to withdraw from the inflating member 12. It will be noted that during such withdrawal of the needle 21, the appliance is held in place by the end of the applicator so that the appliance is not dislodged during the removal of the needle 21. After the needle 21 has been withdrawn or retracted, the applicator is easily disengaged from the appliance and withdrawn from the vagina because the appliance is held on the applicator primarily by the friction between the inflating member 12 and the needle 21.

The inner member 11 and the inflating member 12 shown in Fig. 1 may also be made as an integral unit in the manner shown in Fig. 6. Thus, the inner member 35 shown in Fig. 6 comprises air ducts 15 and 16 and a neck portion 17a which functions in the same manner as the neck portion 17 shown in Figs. 1-3. The portion 14 of the outer member 10 is received in recess 36 and is bonded thereto to provide an air-tight seal with the inner member 35.

Although as mentioned above, it is preferable that the inflating member be provided with a neck portion, it is also possible to construct the appliance of the invention without such neck portion. Such modified form of the appliance is shown in Fig. 4 and it will be seen from Fig. 4 that this modified form of the appliance differs from the form described in Figs. 1-3 primarily in the substitution of a disc-shaped inflating member 32 for the inflating member 12. In Fig. 4, the inflating member 32 is made from puncture-sealing material such as the aforesaid gum rubber and is bonded to the inner member 11a and to the portion 14a of the outer member 10a. When using this form of the appliance or the form illustrated in Fig. 5, the applicator shown in Fig. 1 would be modified by omission of the recess 23 and its surrounding wall structure. Thus, in its retracted position the pointed end 21a of the needle 21 would be withdrawn into the bore 19 of the member 18 and in its inflating position the pointed end 21a would extend beyond the end of the member 18.

If desired, the inner member 11 and the inflating member 12 may be made of the same material and therefore they may be constructed as one unit. Fig. 5 illustrates the form of the member 11a when it is modified to incorporate the inflating member 32 as an integral part thereof, such modified inner member being designated by the numeral 33. As shown in Fig. 5, the inner member 33 has air ducts 15 and 16 and has thin wall 34 over the end of air duct 15 which is punctured by the needle 21 during the insertion and inflation process.

It will be apparent from the above that the appliance of the invention is simple and inexpensive to make and in fact, is sufficiently inexpensive to be disposable. Furthermore, because the outer member 10 is made of thin pliable material, it will conform to irregular contours and form a fluid-tight seal even with low inflating pressures. In addition, because the outer member 10 is highly elastic and inflatable, no fitting of the appliance is required.

The appliance is sufficiently flexible even though inflated to permit removal thereof by grasping the outer member 10 or the neck portion 17 or 17a with the fingers and withdrawing the appliance from the vagina. Alternatively, the outer member 10 can be punctured and deflated before removal or the appliance can be provided with known types of removal devices employed with similar appliances or catamenial devices.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto. This application is a division of application Serial Number 511,473, filed May 27, 1955, now Patent Number 2,856,920.

What is claimed as new and desired to be secured by Letters Patent is:

1. An applicator for a vaginal appliance comprising an elongated tubular member, a hollow needle slidably mounted in the bore of said member, said needle having a pointed end and being movable from a first position in which said pointed end is within said bore to a second position spaced from said first position, means for moving said needle extending exteriorly of said member, and inflating means connected to said needle.

2. An applicator for a vaginal appliance comprising an elongated tubular member, a hollow needle slidably mounted in the bore of said member, said needle having a pointed end and being movable from a first position in which said pointed end is within said bore to a second position spaced from said first position, spring means urging said needle into said first position, releasable catch means for retaining said needle in said second position, means for moving said needle extending exteriorly of said member, and inflating means connected to and movable with said needle.

3. An applicator for a vaginal appliance comprising an elongated tubular member having a recess in one end thereof, a hollow needle slidably mounted in the bore of said member, said needle having a pointed end and being movable from a first position in which said pointed end is adjacent the bottom of said recess to a second position in which said pointed end is adjacent the top of said recess, means for moving said needle extending exteriorly of said member, and inflating means connected to and movable with said needle.

4. An applicator for a vaginal appliance comprising an elongated tubular member having a recess in one end thereof for receiving a portion of said appliance, a hollow needle slidably mounted in the bore of said member, said needle having a pointed end and being mounted with said pointed end adjacent said recess and said needle being movable from a first position in which said pointed end is adjacent the bottom of said recess to a second position in which said pointed end is adjacent the top of said recess, spring means urging said needle into said first position, releasable catch means for retaining said needle in said second position, means for moving said needle extending exteriorly of said member, and inflating means connected to and movable with said needle.

5. An applicator for vaginal appliance comprising an elongated tubular member having a cylindrical recess in one end thereof co-axial with the bore of said member for receiving a portion of said appliance, a hollow needle slidably mounted in said bore, said needle having a pointed end and being mounted with said pointed end adjacent said recess and said needle being movable from a first position in which said pointed end is adjacent the bottom of said recess to a second position in which said pointed end is adjacent but below the top of said recess, spring means urging said needle into said first position, releasable catch means for retaining said needle in said second position, means for moving said needle extending exteriorly of said member, and inflating means comprising a compressible bulb and a valve, said bulb being connected to and being movable with said needle.

References Cited in the file of this patent

FOREIGN PATENTS

| | | |
|---|---|---|
| 273,350 | Germany | Apr. 25, 1914 |
| 463,330 | Germany | July 26, 1928 |